United States Patent [19]

Shekleton et al.

[11] Patent Number: 5,263,315
[45] Date of Patent: Nov. 23, 1993

[54] STARTING OF A SMALL TURBOJET

[75] Inventors: Jack R. Shekleton; Colin Rodgers, both of San Diego, Calif.

[73] Assignee: Sundstrand Corp., Rockford, Ill.

[21] Appl. No.: 612,109

[22] Filed: Nov. 9, 1990

[51] Int. Cl.⁵ .............................................. F02C 7/26
[52] U.S. Cl. ...................................................... 60/39.142
[58] Field of Search ...................................... 60/39.142

[56] References Cited

U.S. PATENT DOCUMENTS

| | | | |
|---|---|---|---|
| 2,457,833 | 1/1949 | Redding | 60/39.142 |
| 2,751,188 | 6/1956 | Rath | 253/77 |
| 2,929,206 | 3/1960 | Davenport | 60/39.142 |
| 3,087,305 | 4/1963 | Hertzog | 60/39.142 |
| 3,238,721 | 3/1966 | Brandes et al. | 60/39.142 |
| 3,635,577 | 1/1972 | Dee | 415/79 |
| 3,824,787 | 7/1974 | Etessam | 60/248 |
| 4,063,850 | 12/1977 | Hueber et al. | 415/214 |
| 4,125,344 | 11/1978 | Tiefenbacher | 416/183 |
| 4,701,106 | 10/1987 | Sasaki | 416/241 B |
| 4,845,944 | 7/1989 | Rodgers | 60/39.161 |
| 4,876,849 | 10/1989 | Klingels | 60/39.161 |
| 4,892,436 | 1/1990 | Mizuno et al. | 403/404 |
| 5,054,283 | 10/1991 | Jones | 60/39.142 |

FOREIGN PATENT DOCUMENTS 0126436  7/1983  Japan .
0839925  6/1960  United Kingdom .

Primary Examiner—Richard A. Bertsch
Assistant Examiner—Howard R. Richman
Attorney, Agent, or Firm—Wood, Phillips, VanSanten, Hoffman & Ertel

[57] ABSTRACT

Difficulties in starting a turbine engine, particularly ones having a small volume combustor (83) with a low dome height, may be avoided by a method including the steps of a) forming the turbine engine compressor (48) of a low density, high temperature resistant ceramic material, b) directing pyrotechnic gases at a temperature of at least about 3,000° F. against the blades (48) of the compressor, c) continuing the step of directing until the turbine rotor (44) is rotating at at least about 60 percent of rated speed and d) combusting fuel in the combustor (83) of the turbine engine to maintain the rotor (44) rotating at at least about 60 percent of rated speed.

11 Claims, 2 Drawing Sheets

STARTING OF A SMALL TURBOJET

FIELD OF THE INVENTION

This invention relates to a small, trust producing, gas turbine engine and more particularly, to the starting thereof.

BACKGROUND OF THE INVENTION

Most relatively small missiles in use today are propelled by solid fuel rockets as opposed to, for example, turbojet engines. The selection of a solid fuel rocket as a propulsion device has been largely dictated by two factors. First, in many instances, a turbine engine cannot be fabricated sufficiently economically as to compete with a solid fuel rocket engine. Secondly, in small size missiles, i.e., those having a relatively small diameter measured on the order of about six inches or less, it has heretofore been extremely difficult to manufacture an efficient turbojet engine that will fit within the envelope required for the propulsion unit for such a missile.

As a consequence of the resulting use of solid fuel rocket engines, some degree of control of the missile flight path or trajectory is lost over that which is available were it possible to propel the missile by a gas turbine engine whose output can be readily varied. Further, even if the gas turbine engine operates relatively inefficiently, the use of such an engine greatly extends the range of the missile.

Recently, in order to overcome the difficulties attendant the use of rocket engines, the assignee of the instant application has produced a gas turbine engine having a diameter of about six inches. These engines are disclosed in U.S. Pat. No. 4,794,754 issued Jan. 3, 1989 to Shekleton, et al and have been extremely successful in meeting the challenge of providing a propulsion unit for small diameter missiles.

To achieve low cost, in order to replace solid rockets as propulsion sources for such missiles, it is necessary that not only the turbojet engines themselves be manufactured relatively inexpensively, but their peripheral systems must likewise be manufactured relatively inexpensively. At the same time, a high degree of reliability is required. The system employed for starting such a turbojet engine is no exception. Thus, the present invention is directed to fulfilling the need for a highly reliable, low cost starting system for a thrust producing gas turbine engine, particularly those that are low cost and expendable.

SUMMARY OF THE INVENTION

It is the principal object of the invention to provide a new and improved gas turbine engine with a low cost starting system. It is also an object of the invention to provide a new and improved method of starting a gas turbine engine.

The invention achieves one or more of the above objects, according to one facet thereof, in a gas turbine engine which includes a centrifugal compressor having blades formed of a material having a low density and a high temperature resistance. A turbine wheel is coupled to the compressor to drive the same and a nozzle is provided for directing the gases of combustion at the turbine wheel during normal operation. A combustor is provided for receiving compressed air from the compressor and fuel from a fuel source to generate the gases of combustion. For starting purposes, a pyrotechnic cartridge for generating hot gases is provided along with at least one start nozzle which is directed toward the compressor blades. Means connect the cartridge and the start nozzle so that hot gases may be directed at the compressor blades to accelerate the same to start the engine. The high temperature resistance of the material of which the compressor blades are formed allows the hot gases to impinge on the blades without damage thereto to achieve rapid acceleration while the low density of the material likewise allows rapid acceleration of the compressor and the turbine wheel coupled thereto to a high percentage of rated speed to achieve a stable combustion point.

The rapid acceleration of the turbine wheel that results from the foregoing also assures that the blades will not be subject to the hot gases for a prolonged period of time to thereby further minimize the possibility of damage thereto.

In one embodiment of the invention, the turbine wheel is also constructed of low density material and in a highly preferred embodiment of the invention, the low density material is a ceramic.

The invention contemplates that the blades have radially outer discharge ends and that one or more start nozzles be directed at the discharge ends. As a consequence of this construction, the acceleration forces of the hot gases are acting over a longer moment arm than would be the case if the hot gases were directed at the compressor blade well inwardly of their radially outermost extent.

In one embodiment, the start nozzle includes a converging section coupled to the connecting mean and a diverging section adjacent the compressor blades. The two are interconnected by a sonic throat. As a consequence of this construction, the gases impinging against the compressor blades will be at supersonic velocity.

In a highly preferred embodiment, to provide for radial compactness of the turbine engine, the compressor is a mixed flow compressor and the nozzle is axially directed.

In a highly preferred embodiment, a ceramic monorotor defines both the centrifugal compressor and the turbine wheel.

According to another facet of the invention, there is provided a method of starting a turbine engine having a combustor which includes the steps of forming the turbine engine compressor of a low density, high temperature resistant ceramic material, directing a high temperature pyrotechnic gas against the blades of the compressor, continuing the step of directing the gas until the turbine rotor is rotating at a predetermined percent of rated speed and combusting fuel in the combustor of the turbine engine to maintain operation thereof.

In a preferred embodiment of the invention, the pyrotechnic gases are at least at about 3,000° F. and the step of directing the same against the blades of the compressor is maintained until the turbine rotor is rotating at at least about 60 percent of rated speed.

In one embodiment of the invention, the step of combusting fuel is initiated by igniting fuel in the combustor by the pyrotechnic gases.

The invention contemplates the step of directing pyrotechnic gases at high temperature against the blades of the compressor and also include the step of directing the pyrotechnic gases against the blades of the compressor at a supersonic velocity.

Other objects and advantages will become apparent from the following specification taken i- connection with the accompanying drawings.

DESCRIPTION OF THE PREFERRED EMBODIMENT

Figure 1:
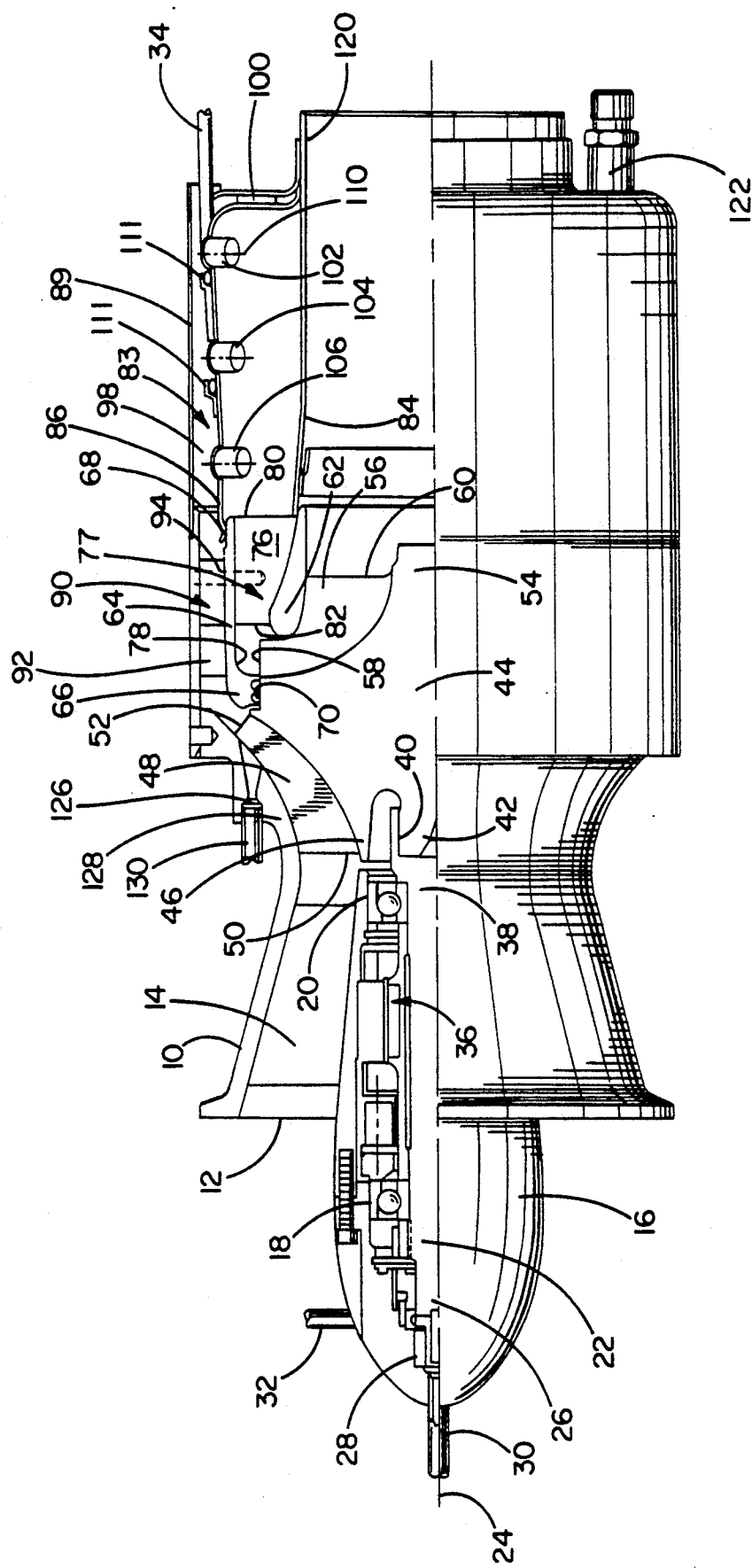
FIG. 1 is a sectional view of a gas turbine engine embodying a starting system made according to the invention.

An exemplary embodiment of a small diameter (i.e. a diameter on the order of about 4 inches) gas turbine, thrust producing engine is illustrated in FIG. 1. Generally, the engine will be in a form of a thrust producing engine, but it should be understood that in some instances, the engine may be utilized in an environment where power is taken from a rotation shaft coupled to the rotor of the engine.

The gas turbine engine of the invention includes a bell shaped, air inlet housing 10 having a forwardly facing open end 12 through which air may enter the engine. A plurality of struts 14 (only one of which is shown) extend radially inwardly to support a bearing and accessory housing 16 centrally within the open end 12. The housing 16 includes axially spaced bearings 18 and 20 which journal a shaft 22 for rotation about an axis 24. One end 26 of the shaft is coupled to a fuel pump 28 for the engine which is adapted to receive fuel on an inlet line 30 from a tank (not shown) and pump the fuel through an outlet 32 to a fuel control system (not shown) which in turn provides fuel for combustion within the engine to a fuel manifold 34 to be described in greater detail hereinafter.

Also contained within the housing 16 is a small permanent magnet generator, generally designated 36, which is utilized to generate electrical power for operating engine and missile controls (not shown).

The end 38 of the shaft 22 opposite the end 26 includes a recess 40 which receives a protuberance 42 on one end of an engine rotor 44. The rotor 44 is a so-called monorotor in that it is of one piece construction. The same is cast of a low density material, preferably of ceramic material so that the rotor will have a low mass and thus may be accelerated rather quickly during a starting sequence. Ceramic material also has good resistance to high temperatures thus allowing a higher operation temperatures for more rapid, reliable starts as will be seen. Preferably, the rotor 44 is brazed to the shaft 22 at the interface of the recess 40 and the protuberance 42.

An end 46 of the rotor 44 adjacent the protuberance 42 mounts a plurality of integral compressor blades 48 which thus are formed of ceramic. The blades 48 include inlet edges 50 and discharge ends 52. As can be see from FIG. 1, the blades 48 are configured to provide a mixed flow rotary compressor which is to say that at the discharge end 52, the flow of compressed gas has appreciable or substantial radial components as well as axial components. This is in contrast to conventional gas turbine engines wherein compressor discharge is either substantially axial or substantially radial.

The end 54 of the rotor 44 opposite the end 46 mounts a plurality of integral turbine blades 56 which likewise are formed of ceramic. The turbine blades 56 have inlet edges 58 which are generally parallel to the axis 24 and downstream edges 60 which typically, but not always, will be generally transverse to the axis 24. Those skilled in the art will immediately appreciate that the blades 56 having the configuration described define a radial turbine wheel.

Figure 2:
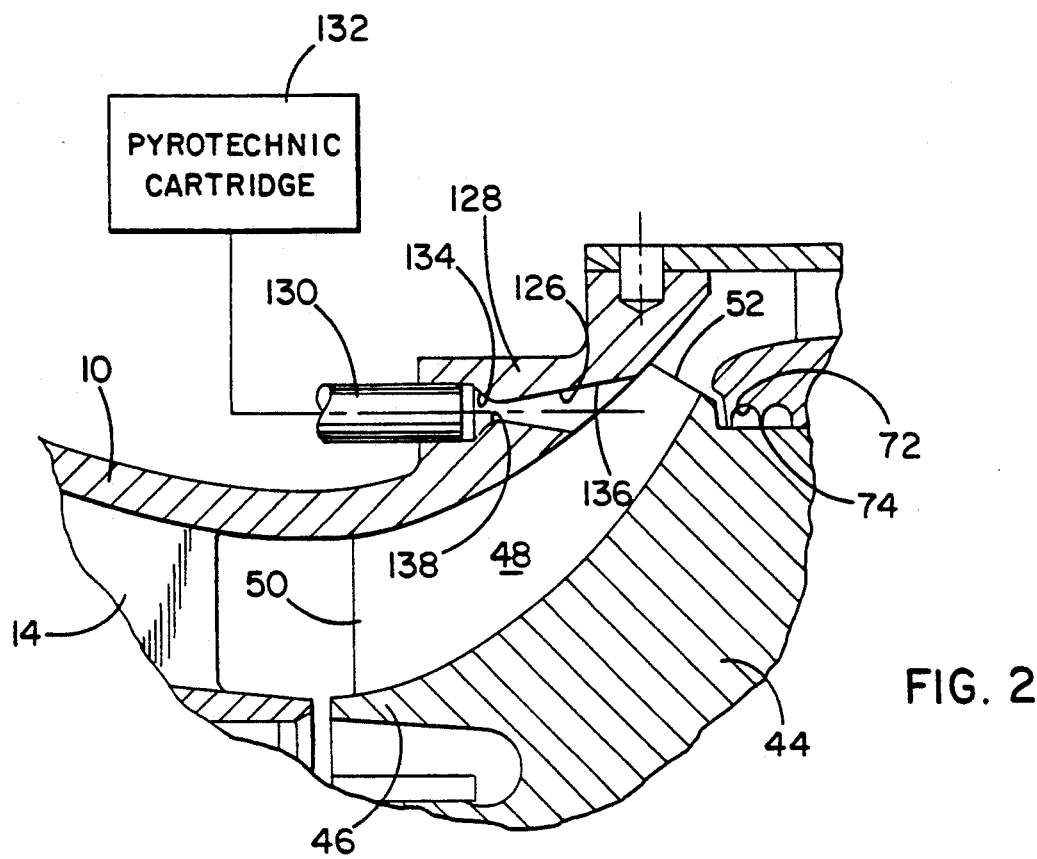
FIG. 2 is an enlarged, fragmentary sectional view of a starting system employed in the engine.

Hot gases of combustion directed against the blades 56 are confined to the spaces between adjacent blades 56 by a rear shroud 62 which, as can be seen in FIG. 1, is axially elongated. Spaced radially outward of the shroud 62 is a sleeve-like partition 64 which is axially elongated and has one end 66 in overlying relation to a land 70 on the rotor 44 separating the compressor blades 48 from the turbine wheel blades 56. As best seen in FIG. 2, a series of radially inwardly opening, annular grooves 72 are located in the radially inner side of the ends 66 of the partition 64 and are separated by annular points or projections 74 that almost, but do not quite, contact the land 70. Thus, a labyrinth seal is defined at the interface of the partition end 66 and the land 70 and is carried by the partition 64.

The end 68 of the partition 64 extends axially the full length of the shroud 62 and a series of axially elongated turbine nozzle blades 76 are supported between the shroud 62 and the partition 64 to define an axial nozzle, generally designated 77. The axially elongated nozzle blades 76 direct hot gases of combustion axially through the space between the shroud 62 and the partition 64 against the blades 58 of the turbine wheel defined thereby to drive the same. In this connection, it will be observed that an annular, concave surface 78 is located intermediate the ends of the partition 64 to direct the axially flowing gases from the blades 76 radially against the turbine blades 56 at their inlet edges 58.

The use of axially elongated blades 76 having leading edges 80 axially spaced from the trailing edges 82 in contrast to the conventional arrangement for nozzle blades in a radial turbine construction allows reduction of the engine diameter. In the conventional case, the trailing edges of the vanes would be radially inward of the leading edges and the outlet of a combustor would be radially outwardly of the leading edges. This adds sizably to the diameter of the machine in contrast to the configuration illustrated wherein a reverse flow, annular combustor, generally designated 83, includes a radially inner wall joined to the shroud 62 and a radially outer wall 86 joined to the partition 64. The space between the radially inner and outer walls 84, 86 at the shroud 62 and the partition 64 define the outlet of the combustor 83 and it will be observed that such outlet has essentially the same radius as the turbine nozzle defined by the blades 76. This clearly illustrates how diametral compactness is achieved through the use of the axial blades 76.

A cylindrical engine case 89 surrounds the combustor 83 and is spaced radially outwardly therefrom. In the vicinity of the partition 64, the same supports, together with the partition 64, a two row, axial, cascade diffuser, generally designated 90, forming no part of the invention. The diffuser 90 includes rows of diffuser vanes 92 and 94 in close proximity to the discharge ends 54 of the compressor blades 48. The configuration of the vanes 92 and 94 may be achieved through conventional art and it will be observed that in the downstream row of vanes, there are twice as many vanes as there are in the first row. Such a configuration extends the stall range.

The case 89 extends about the radially outer wall 86 of the combustor 83 in spaced relation to define an annular plenum 98 which receives the discharge from the diffuser 90. As can be seen in FIG. 1, the combustor 83 is axially elongated and relatively narrow. A radially extending wall 100 interconnecting the radially inner and outer walls 84, 86 remote from the turbine nozzle blades 76 defines the so-called "dome" of the combustor 83 and it will be appreciated that the so-called dome height is but a minor fraction of the axial length of the combustor 83. In the illustrated embodiment, (which is approximately to scale in FIG. 1) the dome height is about $\frac{1}{3}$ of the axial length of the combustor 83.

Three rows of air injection tubes 102, 104, 106 are axially spaced from one another and arranged to establish fluid communication through the radially outer wall 86 between the plenum 98 and the interior of the annular combustor 83. In a typical case, there will be perhaps four of the tubes 102 in a first row nearest the dome or radially extending wall 100, an equal number of the tubes 106 adjacent the nozzle 77 and a commensurate number of intermediate tubes 104 located between the rows of tubes 102 on the one hand and the rows of tubes 106 on the other.

In the usual case, $\frac{1}{3}$ of the air introduced into the combustor 83 will enter through the tubes 106, another $\frac{1}{3}$ through the tubes 104 and the $\frac{1}{3}$ through the tubes 102. The invention takes advantage of this feature of the combustor 83 to maximize the combustor volume. In particular, the radially outer wall 86 is somewhat frusto-conical, diverging outwardly toward the case 89 as one progresses toward the dome or radially extending wall 100. Thus, the plenum 83 progressively is narrowed, but such is entirely permissible since there is a considerably lesser volume of air flowing in the plenum 83 adjacent the row of tubes 102 than there is flowing adjacent the row of tubes 106. As is well known, the increased combustor volume allows the achievement of a greater power level without loss of stability in flame propagation.

The tube 102 has an axis 110 which is transverse to the rotational axis 24 as can be ascertained from FIG. 1 and which is tangential to the space between the radially inner and outer walls 84, 86. The axes of the tubes 104 and 106 are similarly oriented. Thus, the air introduced into the combustor 83 via the tubes 102, 104 and 106 will be moving circumferentially to create a swirling flame. As has been recognized in recent years, the use of swirl within the combustion chamber provides for a stable flame while minimizing the number of fuel injectors and provides the residence time needed to complete combustion in small size combustors by lengthening the path of the fuel and air mixture as combustion takes place.

Fuel injection manifolds 111 associated with the tubes 102 and 104 (FIG. 1) and connected to the manifold 34 may have apertures associated with each of the tubes 102 and 104 within the plenum 98 as more fully disclosed in the previously identified Shekleton, et al. patent. As a result, fuel may be discharged into the air stream entering such tubes to be entrained therewith and directed along with air into the combustor 83.

The radially inner wall 84 of the combustor 83 may be extended past the radially extending wall 100. Such an extension is designated 120 and serves as an exhaust duct for the engine. The wall 100 may likewise support a conventional ignitor 122 which will extend into the interior of the combustor 8 to achieve ignition therein.

For starting purposes, a gas discharge port 126 may be located in a continuation 128 of the inlet housing 10 which additionally serves as a shroud for the compressor blades 48. A conduit 130 may be connected to a source of high pressure gas or the like and when such gas is allowed to flow through the opening 126, it will impinge against the blades 48 to rapidly accelerate the rotor 44 to a speed whereat ignition may be had and stably maintained.

More specifically, according to the invention, the source of high pressure gas is in fact a conventional pyrotechnic cartridge 132 which, when ignited, will provide extremely high pressure gases at high temperatures of at least about 3,000° F. and conceivably as high as 5,000° F. at the compressor blades 48. These gases are passed to the gas discharge port 126 which acts as a nozzle for focusing the hot pyrotechnic gases against the compressor blades 48 near their discharge edges 52.

In fact, there may be a plurality of the gas discharge ports 126, preferably at least three, equally angularly spaced about the axis 24 (FIG. 1). Each includes a converging section 134 connected to the pyrotechnic cartridge 132 by the conduit 130 and a diverging section 136 closely adjacent to the discharge ends 52 of the blades 48. A sonic throat 138 interconnects the converging end 134 with the diverging end 136.

As a result of the foregoing, not only will the hot gases from the pyrotechnic cartridge be applied to the blades 48 at a high temperature of at least 3,000° F., after passing through the throat 138 at sonic velocity, they will have expanded rapidly within the diverging section 136 and achieved supersonic velocity at the time of application to the blades 48 for maximum efficiency and rapid acceleration.

It will be observed that the nozzles defined by the gas discharge ports 126 are axial and act against the radially outer ends of the blades 48. This maximizes the moment arm from the point of application of the hot gases to the rotational axis of the rotor to assure extremely rapid acceleration to minimize the time that each individual blade 48 is exposed to hot gases coming out of the ports 126. It also provides a measure of convenience in manufacture of the engine, particularly when the same is an extremely small diameter engine of, say, for example, four inches in diameter.

In conventional turbines of this sort, the maximum temperature of gases directed against rotor blades such as the turbine blades 56 are at relatively low temperatures of about 2,100° F. At higher temperatures, thermal damage to the metal of which the blades are formed may occur. When metals of greater temperature resistance are utilized to allow higher gas temperatures, the acceleration rate of the rotor during starting is generally slowed since the metals that are more resistant to higher temperatures typically have higher densities. With the resulting slowing of acceleration, the blades are exposed to the hot gases for a longer time and that in turn further inhibits the use of less temperature resistant material or those having relatively high densities.

According to the invention, by forming at least the blades 48 of the compressor end 46 of the rotor 44 of ceramic, and preferably, forming the turbine blades 56 of the turbine end 54 of the rotor 44 of ceramic as well, and even more preferably, in forming the entire rotor 44 as a monorotor with integral blades 48 and 56 of ceramic, the density of the rotating components of the engine may be minimized. This in turn increases the rate of acceleration of the rotatable components of the engine which in turn reduces the length of exposure of the components to the high temperature gases allowing an increase in the temperature of the gases applied thereto. And coupled with a higher temperature resistance provided by a ceramic, it will be appreciated that quite high temperatures may be utilized to achieve rapid acceleration of the rotor 44 well into a stable operating range in short periods of time that may be as little as one second.

Figure 3:
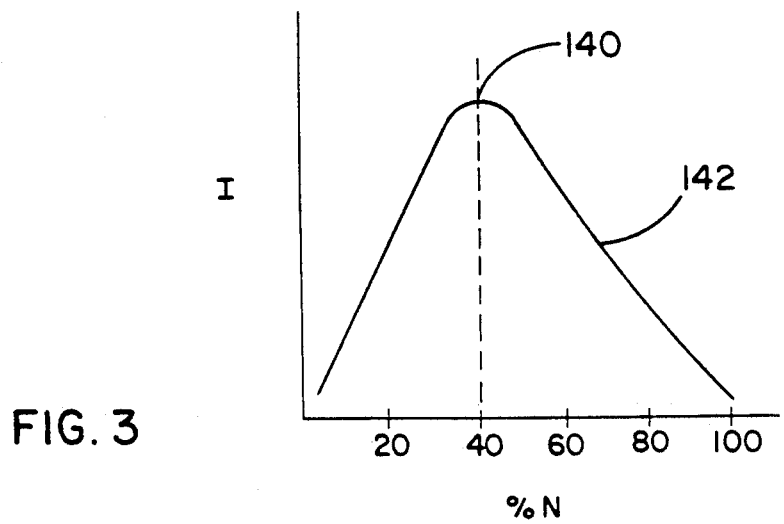
FIG. 3 is a typical plot of the inability to maintain stable and efficient combustion within a turbine engine versus percent of rated engine speed.

FIG. 3 illustrates a typical plot of the inability to maintain stable and efficient combustion within a gas turbine engine versus a percent of rated engine speed. In typical turbines, the greatest difficulty (worst case) in maintaining efficient and stable combustion occurs at intermediate speeds of approximately 40 percent of rated engine speed. If the turbine engine is a so-called low pressure ratio engine, the worst case would occur at a somewhat higher speed whereas if the engine is a so-called high pressure ratio engine, the worst case will occur at a somewhat lower speed. In any event, a typical worst case condition is illustrated at a point 140.

Because of the rapid acceleration achieved by the invention, it is now possible to accelerate the rotor up to 60 or even 80 percent of rated speed before combustion is initiated. This is shown as point 142 in FIG. 3 and it will be immediately recognized by those skilled in the art that the engine is almost immediately operating in an efficient and stable operating zone. So long as engine speed is maintained at 60 percent of rated speed or more, highly stable operation is achieved.

Another advantage may accrue as a result of the high temperature of the gases employed to start the engine. It will be appreciated that such gases, after impinging against the discharge ends 52 of the compressor blades 48 ultimately follow the route of incoming air and pass through the discharge duct 120 of the engine which, of course, means that they have passed through the combustor 83 in the process. In many instances, the temperature of the hot gases at this point in time will be sufficient to cause ignition of any fuel admitted to the interior of the combustor 83 so that the ignitor 122 may be eliminated, thus reducing complexity as well as cost.

Still another advantage may occur. Because the hot gases are flowing through the engine in the manner mentioned immediately preceding, they immediately warm up the parts thereof, particularly those with relatively low mass such as the walls 84, 86 and 100 of the combustor 83. Thus, such walls are at an elevated temperature at the time combustion is initiated and that in turn reduces the difficulties of achieving stable combustion in extremely small combustors as may be employed when the engine is on the order of four inches in diameter.

We claim:

1. A gas small diameter turbine engine comprising:
   a centrifugal compressor having blades formed of a material having a low density and a high temperature resistance;
   a turbine wheel coupled to said compressor to drive the same;
   a nozzle for directing gases of combustion at said turbine wheel;
   an annular combustor of small diameter for receiving compressed air from said compressor and fuel from a fuel source and generating said gases of combustion therefrom;
   a pyrotechnic cartridge for generating hot gases;
   at lease one start nozzle directed toward said compressor blades; and
   means connecting said cartridge and said start nozzle so that hot gases may be directed at said compressor blades to accelerate the same to start said turbine;
   the high temperature resistance of said material allowing the hot gases to impinge on said blades without damage thereto;
   the low density of said material allowing rapid acceleration of said compressor and said turbine wheel to a high percentage of rate speed to a stable combustion point.

2. The small diameter gas turbine engine of claim 1 wherein said turbine wheel is also constructed of said low density material.

3. The small diameter gas turbine engine of claim 2 wherein said low density material is a ceramic.

4. The small diameter gas turbine engine of claim 3 wherein said blades have radially outer discharge ends and said start nozzle(s) is directed at said discharge ends.

5. The small diameter gas turbine engine of claim 3 wherein said start nozzle includes a converging section followed by a compressor blades, and a sonic throat interconnecting said converging and diverging ends. throat extending to a diverging section.

6. The small diameter gas turbine engine of claim 5 wherein said compressor is a mixed flow compressor and said nozzle is axially directed.

7. The small diameter gas turbine engine of claim 1 including a ceramic monorotor defining said centrifugal compressor and said turbine wheel.

8. A small diameter gas turbine engine comprising:
   a mixed flow centrifugal compressor formed of a ceramic material having a low density and a high temperature resistance;
   a low density turbine wheel coupled to said compressor to drive the same;
   a nozzle for directing gases of combustion at said turbine wheel;
   a small diameter, annular combustor for receiving compressed air from said compressor and fuel from a fuel source and generating said gases of combustion therefrom;
   a pyrotechnic cartridge for generating hot gases;
   a start nozzle directed toward said compressor blades near radially outer ends thereof; and
   means connecting said cartridge and said start nozzle so that hot gases may be directed at said radially outer ends of said compressor blades to accelerate the same to start said turbine;
   the high temperature resistance of said material allowing the hot gases to impinge on said radially outer ends of said compressor without damage thereto;
   the low density of said material allowing rapid acceleration of said compressor and said turbine wheel to a high percentage of rated speed to a stable combustion point.

9. The small diameter gas turbine engine of claim 8 wherein said turbine wheel is also formed of ceramic and said start nozzle includes a converging end coupled to said connecting means and a diverging end adjacent said radially outer ends of said 10. The small diameter gas turbine engine of claim 8 where in said small diameter is on the order of about 4 inches.

11. The small diameter gas turbine of claim 8 wherein said combustor is characterized by the absence of an igniter and said pyrotechnic cartridge generates hot gases of sufficient temperature to ignite fuel in said combustor.

* * * * *